Feb. 12, 1946.  C. A. MARTIN  2,394,556
DUST COLLECTOR FOR TILE CUTTING AND SIMILAR MACHINES
Filed June 11, 1943  3 Sheets-Sheet 1
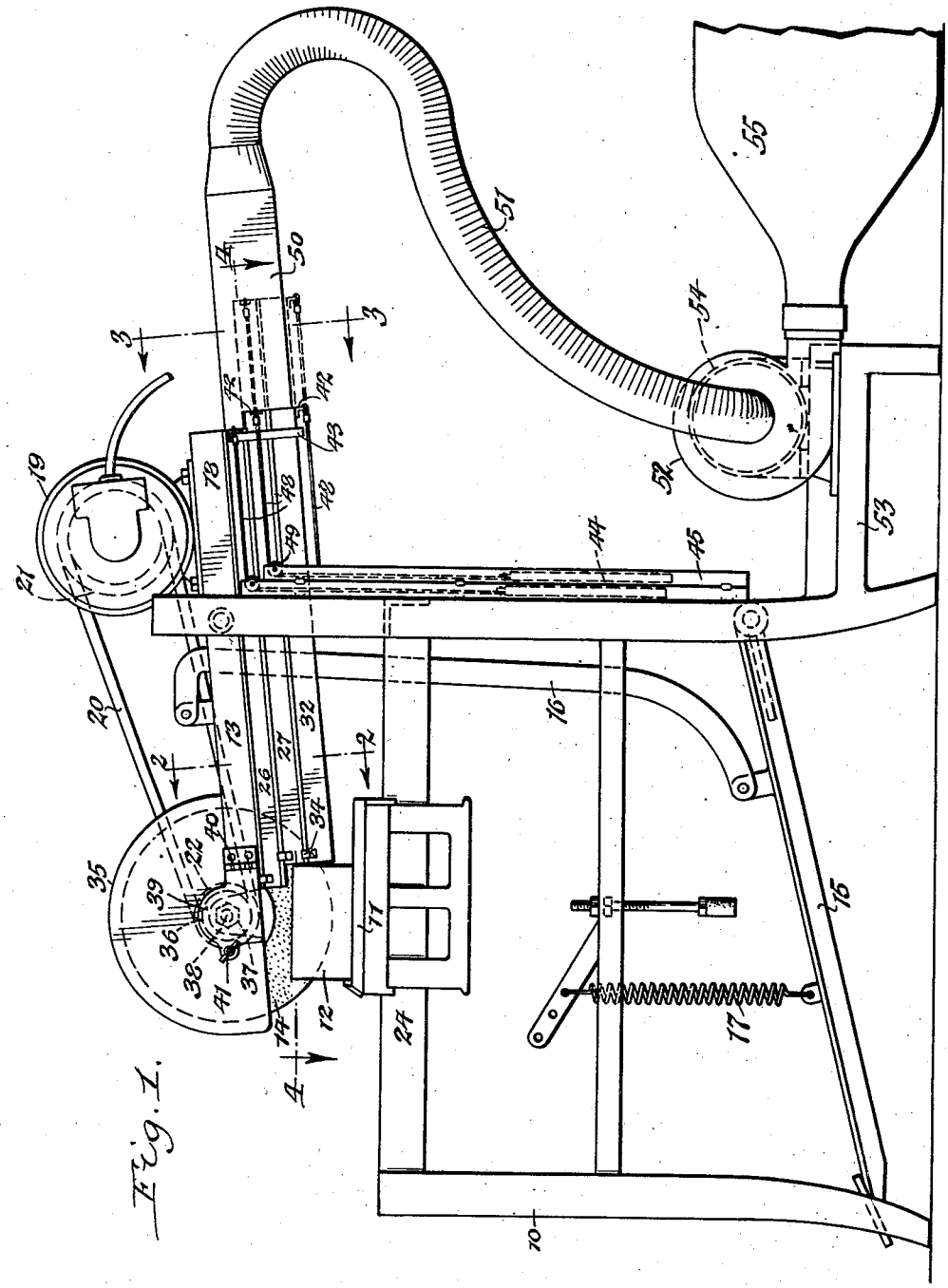
INVENTOR
Charles A. Martin
BY Popp & Popp
ATTORNEYS Feb. 12, 1946.  C. A. MARTIN  2,394,556
DUST COLLECTOR FOR TILE CUTTING AND SIMILAR MACHINES
Filed June 11, 1943  3 Sheets-Sheet 2
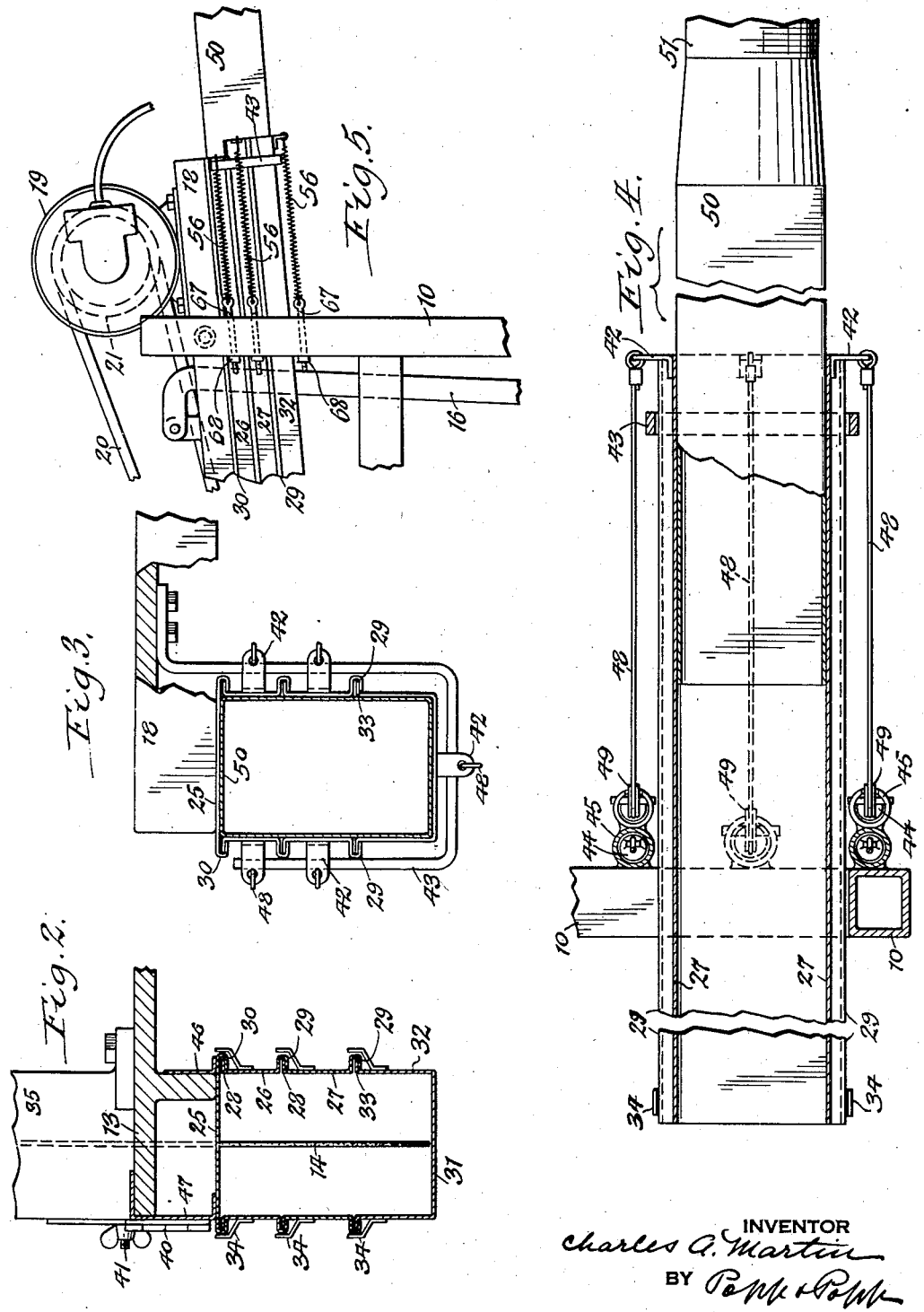
INVENTOR
Charles A. Martin
BY
ATTORNEYS Feb. 12, 1946.  C. A. MARTIN  2,394,556
DUST COLLECTOR FOR TILE CUTTING AND SIMILAR MACHINES
Filed June 11, 1943  3 Sheets-Sheet 3
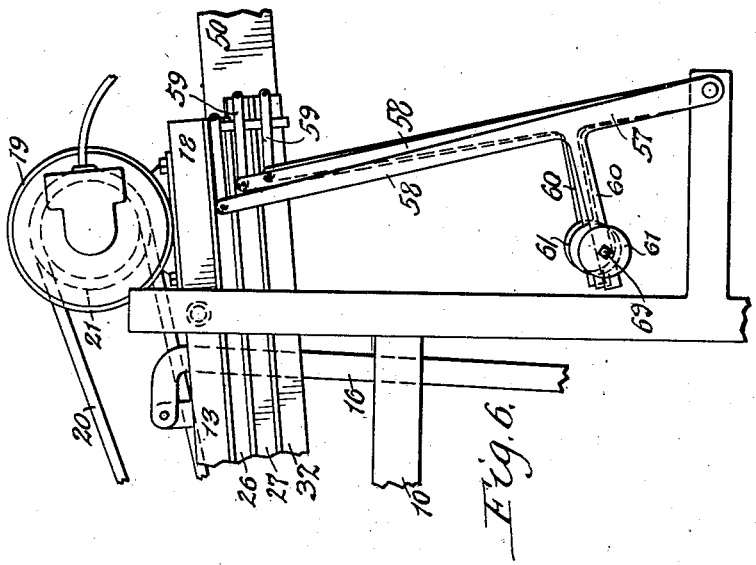
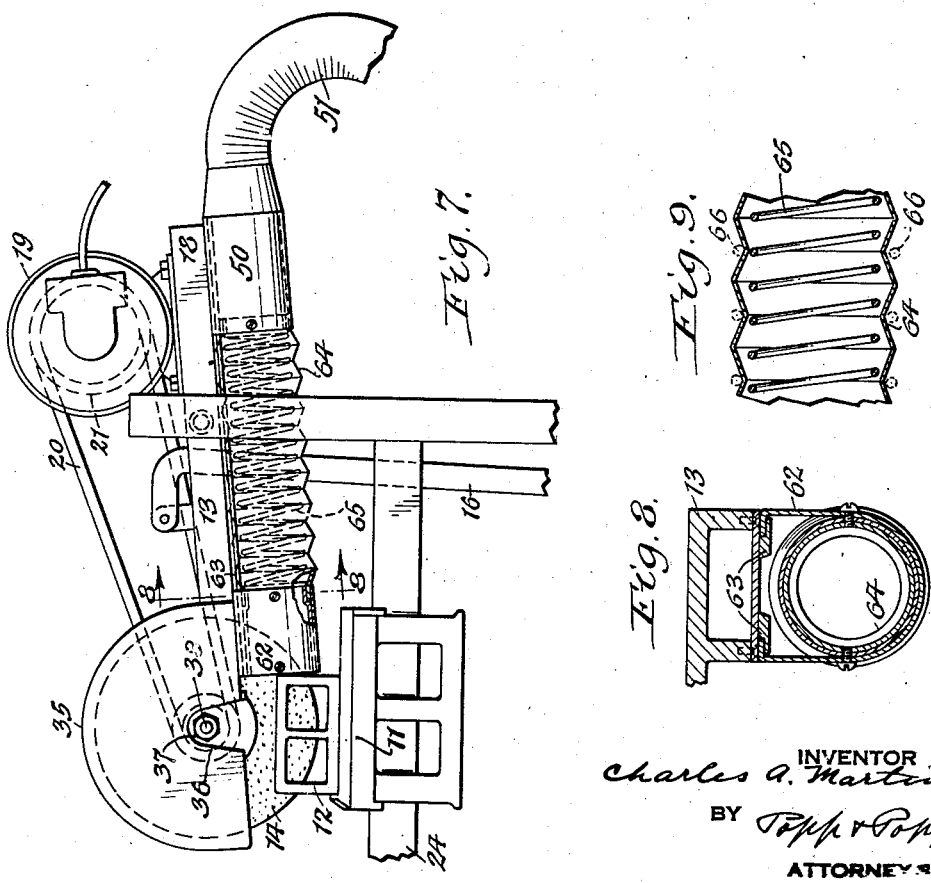
INVENTOR
Charles A. Martin
BY Popp & Popp
ATTORNEYS Patented Feb. 12, 1946

2,394,556

UNITED STATES PATENT OFFICE 2,394,556

DUST COLLECTOR FOR TILE CUTTING AND SIMILAR MACHINES

Charles A. Martin, Buffalo, N. Y.

Application June 11, 1943, Serial No. 490,434

10 Claims. (Cl. 51—273)

This invention relates to an apparatus for removing dust produced by machines while operating on articles and more particularly to machines whereby building blocks, tile, fire brick, refractory materials, masonry products and the like are cut to fit them for use.

When cutting building blocks and tile by machines heretofore constructed the large amount of dust created was uncontrolled and free to scatter or fly around which is not only objectionable because it coats everything in the vicinity of the machine with dust, but also is dangerous to the health of the operator of the machine who can not avoid breathing some of this dust.

It is the object of this invention to provide simple, efficient and practical means whereby dust produced by machines which cut building blocks, tile and the like is carried away from the place where the dust is produced and disposed of or collected in such manner that the vicinity of the cutting apparatus is virtually free from floating dust and thereby avoids objectionable spreading of the same as well as conserving the health of the operator of the cutting apparatus.

In the accompanying drawings:

Fig. 1 is a side elevation of a machine for cutting tile and other like products equipped with a dust removing apparatus or attachment embodying this invention.

Figs. 2 and 3 are fragmentary cross sections, on an enlarged scale, of the same taken on the correspondingly numbered lines in Fig. 1.

Fig. 4 is a fragmentary horizontal section, on an enlarged scale taken on line 4—4, Fig. 1.

Figs. 5, 6 and 7 are fragmentary side elevations of various modifications of this invention.

Fig. 8 is a cross section, on an enlarged scale, taken on line 8—8, Fig. 7.

Fig. 9 is a fragmentary longitudinal section of the flexible exhaust conduit employed in the construction shown in Figs. 7 and 8.

In the following description similar reference characters indicate like parts in the several figures of the drawings.

Although this dust remover may be organized for use in connection with various kinds of machines which produce dust while operating on different articles the machine shown in the drawings, as an example of one in connection with which this invention can be used advantageously, consists of a machine for cutting or sawing tile, fire brick and similar material used for building purposes, and is constructed as follows:

The numeral 10 represents the main frame of the machine which may be of any suitable construction to support the various working parts of the machine. On the upper front part of this frame is mounted a table, bench or carriage 11 upon the upper side of which is adapted to rest the article to be cut, in this instance a hollow tile or block 12 of refractory material which is intended to form part of the masonry structure of a building. On the upper rear part of this frame is pivotally mounted a vertically rocking or swinging beam the front arm 13 of which carries a rotary cutting tool, saw or circular blade 14 whereby the tile is cut. This beam is operated manually for causing its front arm 13 to descend and engage the saw with the tile by a foot lever or treadle 15 pivoted on the lower part of the frame and connected by an upright bar 16 with the front arm 13. When the downward pressure on the foot lever is removed the beam is automatically turned so as to raise its front arm by a spring 17 connecting the foot lever with a part of the main frame. Upon the rear arm 18 of the rocking beam is mounted a motor 19, preferably electrically driven, and motion is transmitted from this motor by a belt 20 passing around driving and driven pulleys 21, 22 mounted respectively on the shafts of this motor and the rotary saw, as shown in Fig. 1. The supporting table 11 is movable horizontally rearwardly and forwardly for the purpose of carrying the tile to be cut relatively to the saw blade and for this purpose the table is guided on a horizontal longitudinal guideway 24 on the upper part of the main frame.

Preparatory to operating the sawing machine for cutting a tile the latter is placed on the table or carriage 11 while the same is arranged on the front part of the guideway 24 and in front of the saw blade, and the beam 13 is turned so that the saw blade is elevated. The saw is now lowered into its operative position by depressing the foot lever or treadle so that the saw stands in the path of the tile and then the table or carriage is moved rearwardly and the tile is passed into engagement with the saw whereby a cut is produced in the same. As a rule only part of the cut in a tile is made during each rearward stroke of the table and the latter is moved rearwardly and forwardly several times past the saw until the required cutting effect has been completed, after which the saw is again raised into elevated inoperative position.

As the saw effects its cutting operation on the tile or other workpiece the formation of the kerf produces considerable dust and this, in the absence of the present invention, would accumulate about the machine or scatter around the vicinity of the same to an objectionable extent as well as endangering the health of the operator and those working with him.

This invention provides means for removing the dust from the machine when the same is produced during the operation of cutting a workpiece and disposes of the same without contaminating the air in the vicinity of the machine or leaving any objectionable accumulation of the same. The particular embodiment of this invention shown in Figs. 1-4 is constructed as follows:

Immediately in rear of the lower operative part of the cutting blade is arranged a pneumatic dust suction head or hood which is adapted to receive the dust from the workpiece 12 adjacent to the rear upper part thereof while the same is being cut by the saw blade. This suction head is so constructed that at the beginning of the cutting operation the suction head is close to and engaged by the tile or workpiece to be cut and as the latter is moved rearward for effecting cutting of the workpiece across its entire width the suction head recedes in the same measure and thus maintains this suction head always in operative relation to the workpiece and catches any dust that is produced during the entire operation of cutting the workpiece.

In the preferred form of this invention shown in Figs. 1-4 this suction head has parts which remain relatively stationary during the operation of moving the table and tile rearwardly and toward the cutter blade and other movable parts which slide telescopically relatively to each other and the stationary parts when a tile is moved rearwardly and forwardly relative to the cutter. The stationary parts comprise a horizontal longitudinal top wall or plate 25 which is arranged lengthwise below the rocking beam and preferably made of sheet metal and secured thereto by brackets 46, 47 also preferably made of sheet metal.

The movable parts of this suction head comprise two sectional sides or walls arranged on opposite longitudinal sides of the head and a trough-shaped bottom section arranged on the underside of the suction head. Each of the sectional side walls includes a plurality of longitudinal bars 26, 27 arranged one above the other and each having an upper longitudinal outwardly projecting guide flange 28 and a lower inwardly opening guide channel 29. The upper flanges 28 of the upper bars 26 slide lengthwise in inwardly opening guide channels 30 formed lengthwise on opposite edges of the top wall or plate 25 and the upper flanges 28 of the lower bars 27 slide lengthwise in the lower guide flanges 29 of the upper bars 26. The lower trough bottom section has a lower bottom or wall 31 and two sides 32 projecting upwardly from the bottom and provided at their upper longitudinal edges with outwardly projecting guide flanges 33 which slide lengthwise in the guide channels 29 of the lower bars 27, as shown in Figs. 1 and 2. Lateral disengagement of the guide flanges 28, 33 from the guide channels 30, 29 is prevented but lengthwise sliding of the bars 26, 27 and bottom section 31, 32 relative to each other and to the top 25 is permitted by lateral stops having the form of clips 34 secured to the outer sides of the side walls 32 of the bottom section and the upper and lower side bars 26, 27 and adapted to engage the outer sides of the guide channels 29, 30 respectively.

The front end of the top wall 25 of the suction head connects with the lower edge of the rear part of the guard or hood 35 which encloses the upper part of the saw blade and is mounted on the front arm 13 of the rocking beam so that this hood in effect forms a front extension of the suction head over the saw blade, as shown in Fig. 1. This hood is provided on its side with an opening 36 around the center of the saw blade through which access may be had to the nut 37 whereby the saw blade is detachably secured to the arbor or shaft 38 which carries the saw blade and the driven pulley 22. In order to confine the suction to the open lower side of this hood and thus carry away the dust more effectively the side opening 36 of the hood is covered by a door or plate 39 which is pivotally connected at one edge with the hood by a hinge 40 and detachably connected at its opposite edge with the hood by a bolt 41, as shown in Fig. 1.

The several longitudinally movable members of the suction head when in their foremost position have their front ends arranged along the lower edge and the opposite sides of the rotary cutter or saw blade on a line between the axis of this blade and the rear part of its edge. These longitudinally movable members of the suction head are limited in this forward movement by stop means consisting preferably of stop lugs 42 arranged on the outer side of the suction head members 26, 27, 31 and engaging with a bracket 43 mounted on the rear arm 18 of the rocking beam and embracing the suction head. The several longitudinally movable members of the suction head are yieldingly held in this forward position by shifting means which may vary in construction but which, as shown for example in Figs. 1-4, may comprise a plurality of weights 44 movable vertically in guide tubes 45 mounted on the main frame and a plurality of pull cords or lines 48 each of which passes around a pulley 49 on the main frame and has the rear end of its horizontal part connected with a stop plug 42 on the respective slidable member of the suction head and the lower end of its vertical part connected with one of said weights 44.

Exhausting means are provided for causing any dust produced by cutting a tile to be drawn into the suction head and delivered to separating means which separate and retain the dust from the dust laden air and permit the clarified air to escape to the atmosphere. The preferred means for accomplishing this purpose are constructed as follows:

The numeral 50 represents the relatively rigid front inlet chamber of an exhaust conduit which communicates with the rear end of the suction head and 51 the flexible body of this conduit which is connected at its front end with said inlet while its rear end is connected with the eye of an exhaust fan or blower 52 whereby a rearward flow of air and dust is produced in this conduit. The inlet chamber is preferably rectangular in cross section, as shown in Fig. 3, and has its upper side or top secured to the rear arm of the rocking beam and has its lateral sides and bottom slidingly engaged by the longitudinal movable side and bottom members of the suction head, thereby forming a sliding connection between parts of the suction head and the exhaust conduit. The exhaust fan or blower may be of any suitable construction and is preferably mounted on a stand 53 forming the rear lower part of the main frame. The exhaust fan may also be driven by various means, for example by an electric motor 54 connected with the rotor or blades of the same.

Although the dust laden air which is carried away from the tile may be discharged at some point which is remote from the place where the cutting occurs and under non-objectionable conditions it is preferable to deliver this dust laden air into a filtering bag 55 which is detachably connected with the outlet of the fan whereby the dust is separated from the air and retained in the bag while the clarified air escapes through the screen-like fabric of the bag to the atmosphere, thereby avoiding the objectionable conditions heretofore mentioned.

In the operation of this apparatus the operator places the tile or other article to be cut on the table or carriage while the latter is located at a distance from the front of the saw. The cutter is then lowered into its operative position in which it is in the rearward path of the tile. Upon moving the carriage rearwardly the tile is engaged with the saw and the latter begins to cut the same. During the first part of this cutting operation the dust produced is carried away into the suction head while the longitudinal movable members of this head are at rest in their foremost position. After the initial part of cutting the tile has been effected the tile engages the front end of one or more of the longitudinally movable members of the suction head and pushes the same rearwardly in the same measure as the tile advances and thus maintains a substantially closed space around the saw and the tile where the latter is being cut and thus insure sucking all, or practically all, of the dust away from the place where it is produced. The number of longitudinally movable members of the suction head which are moved rearwardly during a cutting operation depends on the height of the tile and the diameter of the cutter blade. When the tile is of medium height then the same will engage its rear edge with the lowermost and intermediate of the longitudinally movable members of the telescopic suction head and move the same rearwardly, as shown in Fig. 1. If, however, the tile is of less height then the same will engage its rear edge with only the lowermost telescopic member of the suction head, and if the tile which is being cut is of greater height then the same will engage its rear edge or side with the front edges of all of the several telescopic members of the suction head and move the same rearwardly in unison relative to the top of this head during the operation of completing the cut of the respective tile. As the diameter of the saw or cutting blade becomes smaller due to wear or when a comparatively thin workpiece is being cut, the blade and suction head descend a correspondingly greater distance toward the sliding carriage 12 and under these conditions the rear edge of this carriage will engage one or more of the longitudinally movable suction head sections and move the same rearwardly as the cutting of the workpiece progresses, thereby maintaining the suction head always in the proper relation to the workpiece for effectively removing the dust which is produced during the cutting operation.

When the tile is moved forwardly after the cutting of the tile has been completed, the several longitudinally movable suction head sections are automatically returned to their foremost position by the return weights 44 preparatory to being moved rearwardly by the next tile which is to be cut. It will thus be apparent that the several sections of the suction head are slidable lengthwise independently of each other and thus enable the front end of the head to adapt its form to the character of the workpiece which is being cut and the variation in its height as cutting of the same progresses.

As the rocking beam carrying the cutter, motor, suction head and parts associated with the same oscillates in a vertical plane relative to the stationary fan or blower the flexible portion of the suction conduit bends accordingly and maintains the suction head in operative relation to the exhausting device and the air and dust separating or filtering bag.

Instead of utilizing weights for moving the longitudinally movable members of the suction head forwardly and holding them yieldingly in this position, the same effect may be produced by spring means which include a plurality of helical springs 56 each of which is connected at its opposite ends with the main frame and the rear end of one of the longitudinally movable members of the suction head, as shown in Fig. 5. The tension of each of these springs may be adjusted by any suitable means, for example by an adjusting bolt 67 movable on a part of the main frame and connected with the front end of the respective spring and an adjusting screw nut 68 arranged on this bolt and bearing against said frame part, as shown in Fig. 5.

If desired the forward movement of the longitudinally movable sections of the suction head may be effected and also yieldingly held in their foremost position by the means which are shown in Fig. 6 and comprise a plurality of T-shaped levers, each of which has a lower arm or part 57 pivoted on the main frame, an upper arm or part 58 connected by a link 59 with the rear end of one of the longitudinally movable sections of the suction head, and an intermediate arm 60, a weight 61 mounted on each of the arms 60 and adjustable thereon relative to the axis of the respective lever, and a set screw 69 for holding each weight 61 in its adjusted position.

Another way of accomplishing this purpose is to construct the suction head in the form of a U-shaped chamber 62 which encloses the lower rear part of the cutting saw or blade and is slidable by means of longitudinal guideways 63 on the underside of the front arm 13 of the rocking beam, as shown in Figs. 7 and 8, a longitudinally expansible and contractible neck 64 connecting the rear end of the suction chamber 62 with the inlet chamber 50 of the delivery conduit, and a helical spring 65 which is arranged within this neck, as shown in Figs. 7 and 9, and serves to maintain the same in a distended and elongated position. This spring also causes the suction chamber 62 to be moved into its foremost operative position relative to the cutting saw and to be engaged by and moved rearwardly by the tile which is being cut so as to concentrate the suction effect of the suction head to that part of the saw and tile where the cutting operation is taking place.

If desired the spring means for holding the neck yieldingly in a longitudinally extended position may be arranged externally of this neck, a helical spring 66 being shown by dotted lines for this purpose in Fig. 9.

Inasmuch as this invention enables the dust created during the operation of cutting tile and the like to be carried away from the place where the cutting occurs and to be disposed of so that the dust will not accumulate on the cutting machine, nor in the vicinity thereof, the objectionable conditions heretofore mentioned are eliminated and the health of the operator preserved.

I claim as my invention:

1. In an article cutting machine, the combination of a main frame, a carriage movable lengthwise on said frame and adapted to support an article to be cut, a tool for cutting said article, a support which carries said tool and which is movable toward and from the path of said carriage, and means for removing dust which is produced when cutting said article and which includes a suction head slidable lengthwise on said support and adapted to be engaged by the article which is being cut and moved thereby rearwardly of said cutting tool, and exhausting means connected with said suction head and drawing dust laden air therethrough.

2. In an article cutting machine, the combination of a main frame, a carriage movable lengthwise on said frame and adapted to support an article to be cut, a tool for cutting said article, a support which carries said tool and which is movable toward and from the path of said carriage, and means for removing dust which is produced when cutting said article and which includes a suction head slidable lengthwise on said support and adapted to be engaged by the article which is being cut and moved thereby rearwardly of said cutting tool, exhausting means connected with said suction head and drawing dust laden air therethrough, and filtering means which receive the dust laden air from said exhausting device and separates the dust and air.

3. A machine for cutting tile and similar articles comprising a tool for cutting an article, means including a carriage whereby said article is moved past said tool, a support upon which said tool is mounted and which is movable toward and from said carriage, and a suction head which is adapted to receive the dust laden air resulting from the cutting of said article and which includes a relatively fixed section and at least one movable section which is slidable lengthwise of the fixed section.

4. A machine for cutting tile and similar articles comprising a tool for cutting an article, means including a carriage whereby said article is moved past said tool, a support upon which said tool is mounted and which is movable toward and from said carriage, and a suction head which is adapted to receive the dust laden air resulting from the cutting of said article and which includes a relatively fixed upper section mounted on said support, a plurality of side sections slidable relative to said upper section and a lower section which is slidable relative to said side sections.

5. A machine for cutting tile and similar articles comprising a tool for cutting an article, means including a carriage whereby said article is moved past said tool, a support upon which said tool is mounted and which is movable toward and from said carriage, and a suction head which is adapted to receive the dust laden air resulting from the cutting of said article and which includes a relatively fixed upper section mounted on said support, a plurality of side sections slidable relative to said upper section and a lower section which is slidable relative to said side sections, said sections being slidingly connected by interengaging longitudinal guide flanges and channels arranged on the respective opposing edges of said sections.

6. A machine for cutting tile and similar articles comprising a tool for cutting an article, means including a carriage whereby said article is moved past said tool, a support upon which said tool is mounted and which is movable toward and from said carriage, and a suction head which is adapted to receive the dust laden air resulting from the cutting of said article and which includes a plurality of sections slidable lengthwise relative to one another, and means moving said sections forwardly including pull lines connected at one end with said sections and provided at their opposite ends with weights.

7. A machine for cutting tile and similar articles comprising a tool for cutting an article, means including a carriage whereby said article is moved past said tool, a support upon which said tool is mounted and which is movable toward and from said carriage, and a suction head which is adapted to receive the dust laden air resulting from the cutting of said article and which includes a plurality of sections slidable lengthwise relative to one another, means moving said sections forwardly including pull lines connected at one end with said sections and provided at their opposite ends with weights, and stop means for limiting the forward movement of said sections.

8. A machine for cutting tile and similar articles comprising a tool for cutting an article, means including a carriage whereby said article is moved past said tool, a support upon which said tool is mounted and which is movable toward and from said carriage, and a suction head which is adapted to receive the dust laden air resulting from the cutting of said article and which includes a plurality of sections slidable lengthwise relative to one another; and means for moving said sections forwardly including springs connecting said sections with a stationary part.

9. A machine for cutting tile and similar articles comprising a tool for cutting an article, means including a carriage whereby said article is moved past said tool, a support upon which said tool is mounted and which is movable toward and from said carriage, and a suction head which is adapted to receive the dust laden air resulting from the cutting of said article and which includes a plurality of sections slidable lengthwise relative to one another; and means for moving said sections forwardly including a plurality of levers, links connecting said levers with said sections, and weights mounted on said levers.

10. A machine for cutting tile and similar articles comprising a tool for cutting an article, means including a carriage whereby said article is moved past said tool, a support upon which said tool is mounted and which is movable toward and from said carriage, and a suction head which is adapted to receive the dust laden air resulting from the cutting of said article and which includes a suction chamber enclosing part of said tool and slidable relative thereto, a suction conduit having an inlet chamber, a neck which connects said suction chamber and inlet chamber and which is adapted to be expanded and contracted lengthwise, and a spring arranged within said neck and operating to hold said neck in a laterally distended condition and also serving to move said suction head into its foremost position.

CHARLES A. MARTIN.